United States Patent

Fiorentini

[11] Patent Number: 5,915,135
[45] Date of Patent: Jun. 22, 1999

[54] FIVE-LENS CAMERA WITH MOVEABLE INTERNAL MASK FOR SINGLE OR QUADRUPLE IMAGES

[76] Inventor: Achille Fiorentini, via Genova 23, Padova, Italy, 35142

[21] Appl. No.: 09/015,931

[22] Filed: Jan. 30, 1998

[51] Int. Cl.⁶ .................................................. G03B 41/00
[52] U.S. Cl. ............................................................ 396/323
[58] Field of Search ..................................... 396/322, 323, 396/333, 334, 340

[56] References Cited

U.S. PATENT DOCUMENTS 4,101,913  7/1978  Gallistel et al. .
4,140,381  2/1979  Douglas .
5,479,229  12/1995  Minamikawa .

FOREIGN PATENT DOCUMENTS 213001  3/1924  United Kingdom .

*Primary Examiner*—Howard B. Blankenship
*Attorney, Agent, or Firm*—Dowell & Dowell, P.C.

[57] ABSTRACT

A camera for use with film preferably of the instantaneous development type which includes a central lens and four peripheral lenses spaced at the vertexes of an imaginary quadrilateral dividing a front of the camera. An external operating mechanism is provided to move an internal mask to a first position so as to define a frame for dividing film into four segments which are exposed through shutters associated with the four peripheral lenses or to lower the mask to a position wherein the central lens is used to expose the film.

17 Claims, 3 Drawing Sheets

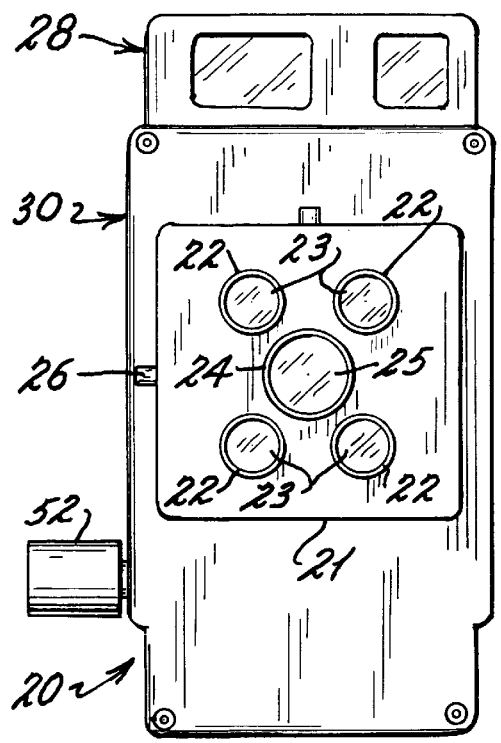
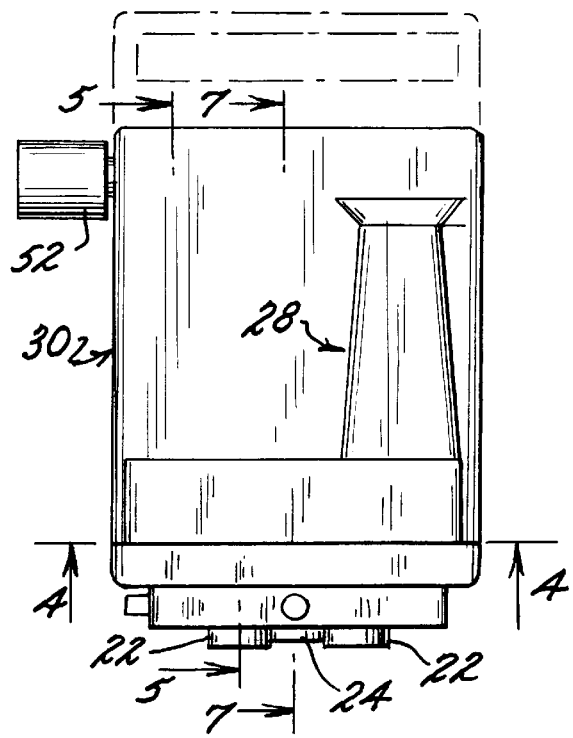
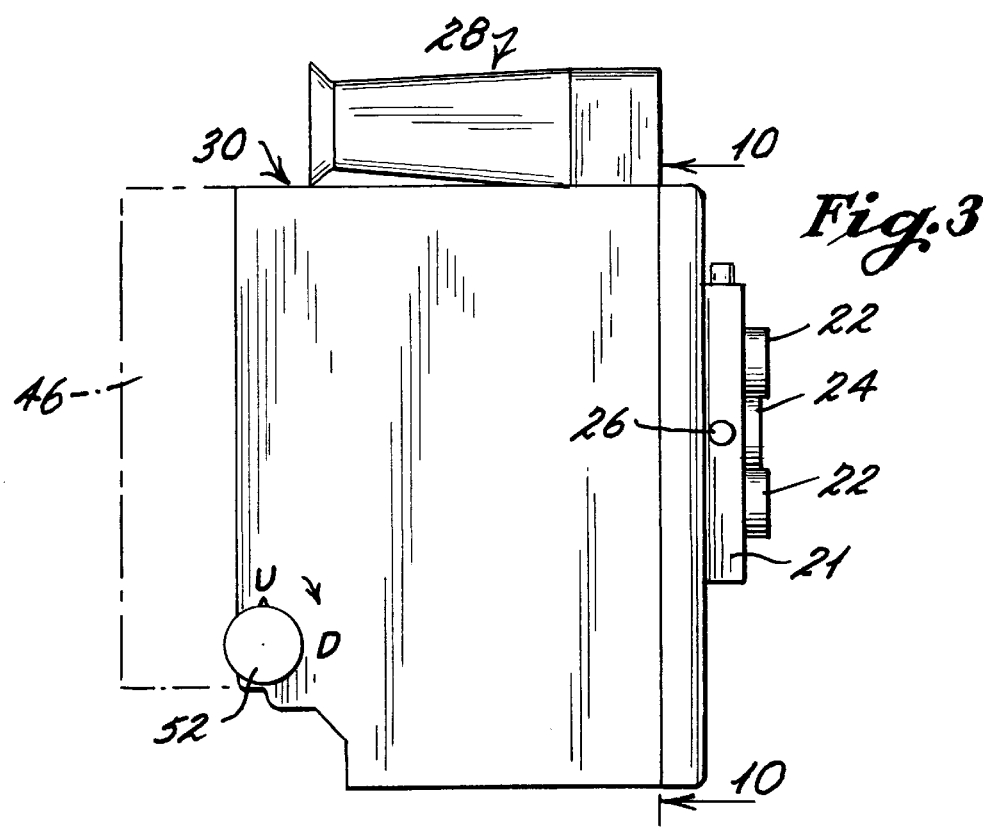

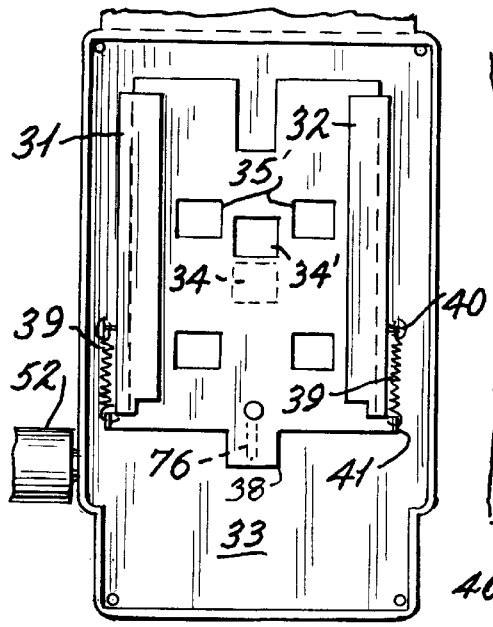
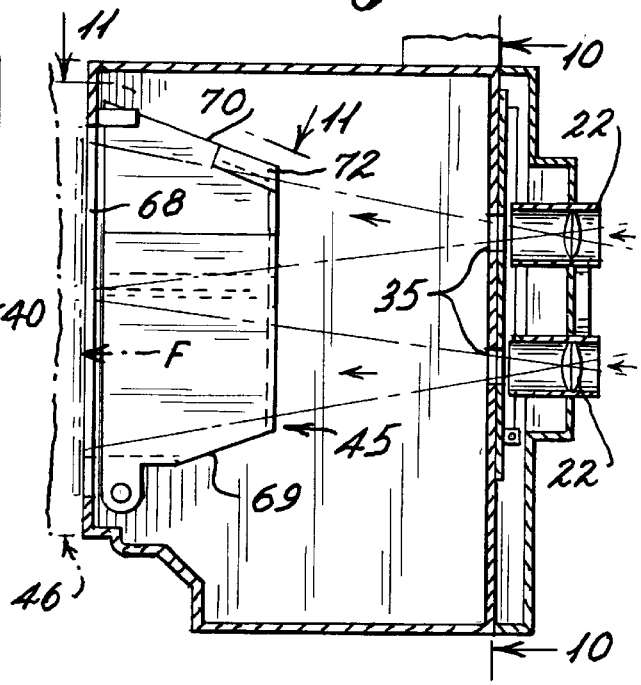
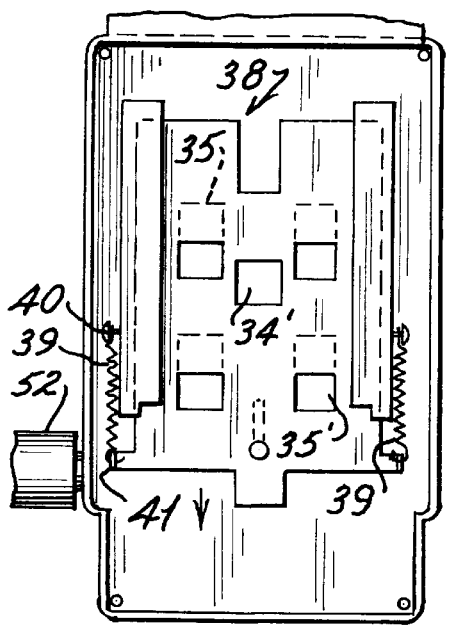
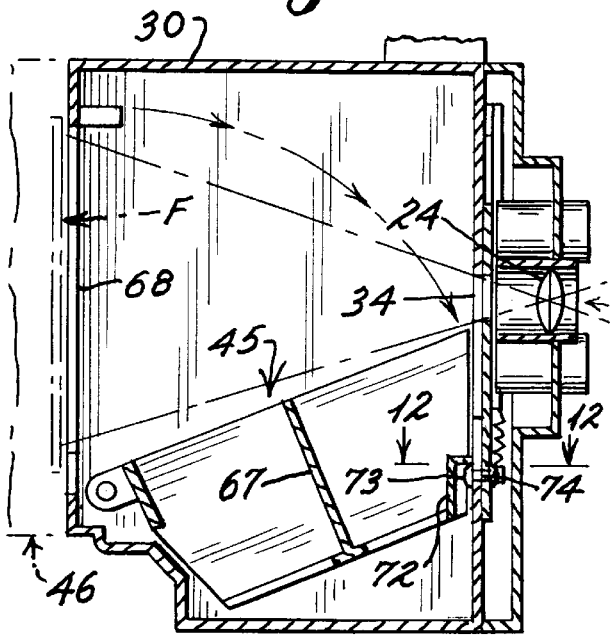

FIVE-LENS CAMERA WITH MOVEABLE INTERNAL MASK FOR SINGLE OR QUADRUPLE IMAGES

BACKGROUND OF THE INVENTION

This invention relates to photographic cameras operable in a first mode with a single central lens used to expose a frame of film and in a second mode wherein a single frame is masked and exposed in four sections using four spaced lenses.

At present there are cameras that produce a single image on a film and cameras provided with four lenses that produce four identical images on four portions of a single frame of film. There are also cameras that can produce one or four images, equal to or different from one another on the same film. The latter cameras employ complex systems of lenses and mirrors, and they are very expensive and cumbersome.

SUMMARY OF THE INVENTION

Therefore, a new kind of camera has been designed and carried out, which produces single or quadruple images on the same frame of film.

The new camera is provided with five lenses; four lenses are positioned at the vertexes of an imaginary quadrilateral into which the front of the camera is divided, while the fifth lens is placed at the center with respect to the other four. The camera is equipped with an internal moveable mask defining four rectangular openings, which divides a film frame in four portions, which are positioned side by side in pairs. A mechanism controlled by a lever, or an external knob, moves the internal mask relative to the film and also moves a selector plate having a central and four outer openings therein to either open the central lens or the peripheral lenses to the film. When the user wants to obtain a single image, he has to activate the external lever or knob in such a way as to lower the internal mask and thereby open the central lens and simultaneously block the peripheral lenses by movement of the selector plate and thereafter press the release trigger that activates only a shutter of the central lens.

When, on the other hand, the user wants to obtain four identical and separate images on the same frame of film, the lever or the knob is moved in such a way as to raise the internal mask and to position it before the film. This movement causes the selector plate to block the central lens and open the peripheral lenses to the film. Thereafter, the release trigger that activates only the shutters of the four peripheral lenses is activated. The images projected through the four lenses pass through four openings in the selector plate to the four portions of the film defined by the mask that distinctly separates the four images.

To further prevent the images of the four lenses from interfering with one another creating superimpositions or halations around the edges, the lenses and the mask are provided with vertical and horizontal screens which extend therefrom generally parallel to the axes of the lenses.

BRIEF DESCRIPTION OF THE DRAWINGS

The following is an example of the present invention wherein:

FIG. 1 is a front plan view of the camera of the invention;

FIG. 2 is a top plan view of the camera of FIG. 1;

FIG. 3 is a right side view of the camera of FIG. 1;

FIG. 4 is a partial cross-sectional view taken along line 4—4 of FIG. 2 showing a slide selector mechanism being in a first position in which the central lens of the camera is obscured from the film within the camera while the four peripheral lenses are open to the film within the camera;

FIG. 5 is a cross-sectional view taken along line 5—5 of FIG. 2;

FIG. 6 is a view similar to FIG. 4 showing the slide selector mechanism moved to a second or lower position wherein the central lens is open to the film within the camera and the four peripheral lenses are obscured from the film within the camera;

FIG. 7 is a cross-sectional view taken along line 7—7 of FIG. 2;

DESCRIPTION OF THE PREFERRED EMBODIMENTS

Figure 8:
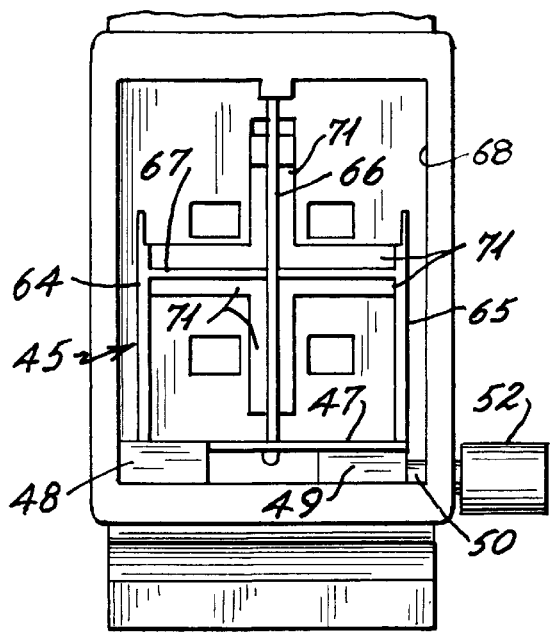
FIG. 8 is a partial cross-sectional view taken along line 8—8 of FIG. 2 showing the internal mask in a raised position with the selector slide mechanism in the position shown in FIG. 4 allowing exposure of a film frame through the four peripheral lenses of the camera.

The camera of the present invention is specifically constructed so as to allow the selective taking of either a single photograph on a conventional size film frame or four photographs on the same film frame by effectively dividing the film frame into four separate areas aligned with four separate lenses associated with the camera. In this respect, the camera 20 includes four peripheral lenses 22 which are spaced outwardly in generally equally spaced relationship with respect to a central lens 24 toward the four corners of the front portion 21 of the camera. The peripheral lenses 22 include conventional shutter mechanisms 23 and the central lens includes a conventional shutter member 25. The shutters 23 and 25 may be operated by any conventional shutter control mechanism and, for purposes of illustration, a shutter release button 26 is shown extending from the front portion of the camera. The button 26 is utilized to operate the shutters of the peripheral lenses and central lens shutter simultaneously. In some embodiments, separate buttons could be used to operate the central and peripheral lens shutters. A conventional view finder 28 is shown in FIGS. 1 and 2 as being mounted along the upper portion 29 of a central housing 30 of the camera.

The camera of the present invention is designed to include the front lens portion 21 which is secured to a pair of mounting rails 31 and 32 disposed on the front wall 33 of the central housing 30. Appropriate threaded fasteners are also utilized to anchor the front portion 21 relative to the central portion through aligned openings provided in the front wall 33 of the central housing.

As shown in FIGS. 5 and 7, a central generally rectangular opening 34 is provided in the central portion of the front wall 33 which aligns with the central lens 24 of the camera. In addition, four peripheral generally rectangular openings 35 are spaced outwardly from the central opening so as to be in alignment with the peripheral lenses 22. To regulate which of the central or peripheral lenses will be utilized to expose a frame of film "F" mounted within the camera, a slidable selector plate 38 is mounted between the mounting flanges 31 and 32 and is slidable with respect thereto, as shown in FIGS. 4 and 6. The selector plate 38 includes a central opening 34' which is selectively alignable with the central opening 34 in the front wall 33 when the selector plate is in a lower position, as shown in FIG. 6, but is obscured or blocked from the central opening 34 when the selector plate is in an upper position, as shown in FIG. 4. In a like manner, the selector plate also includes four peripheral generally rectangular openings 35' therein which are designed to be aligned with the openings 35 in the front wall 33 of the central camera housing when the selector plate is in the upper position of FIG. 4 but which block or obscure the openings 35 when the selector plate is in the lower position shown in FIG. 6. To move the selector plate 38 from the lower position of FIG. 6 to the upper position of FIG. 4, a pair of springs 39 have one end mounted to fixed studs 40 extending outwardly from the mounting channels 31 and 32 with the opposite ends being connected to outwardly extending flanges 41 of the selector plate.

To effect the movement of the selector plate 38 from the position shown in FIG. 4 to the position shown in FIG. 6, an internal mask or frame member 45 is provided which is pivotable within the central housing of the camera from a raised position, as shown in FIG. 5, to a lower position as shown in FIG. 7.

Figure 9:
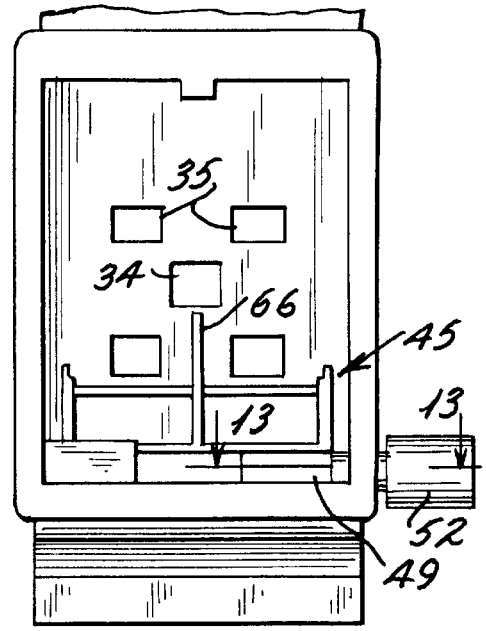
FIG. 9 is a view similar to FIG. 8 showing the internal mask being pivoted to a lower position wherein the selector mechanism is in the position of FIG. 6, thereby obscuring the four peripheral lenses and opening the central lens to the film within the camera.

With specific reference to FIGS. 3 and 8, the mask 45 is designed to be positioned adjacent to a frame of film "F" contained within a film cassette 46 secured to the back of the central housing of the camera. The film may be contained in a self-ejecting cassette or the film may be wound by use of opposing rollers (not shown) utilizing conventional roll film. The mask includes a base portion including a horizontal plate 47 having a pair of downwardly oriented blocks 48 and 49 extending therefrom. Extension block 48 has a pivot pin (not shown) extending therefrom which is seated within an opening of the side wall of the camera, whereas block 49 has a hollow pivot shaft 50 extending therefrom which is seated within an enlarged opening in the opposite side wall of the camera. Movement of the pivot shaft 50 is effected by a control knob 52 which extends outwardly from a side wall of the camera, as shown in FIGS. 8 and 9.

Figure 13:
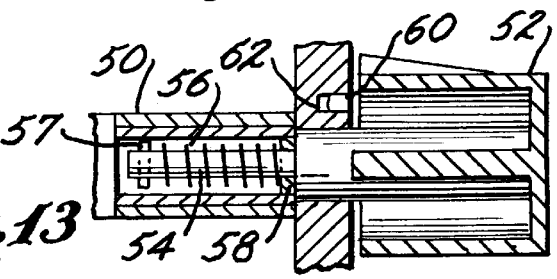
FIG. 13 is an enlarged view taken along line 13—13 of FIG. 9.

With particular reference to FIG. 13, the control knob 52 has a shaft 54 extending therefrom which is seated within the hollow pivot shaft 50 of block 49. The shaft 54 is surrounded by a spring 56 having one end which engages a pin or head portion 57 of the shaft 54 and an opposite end which engages against an inwardly extending seat 58. The control knob is rotatable between a first or up position, as shown in FIG. 3, to a second or down position, so as to selectively raise or lower the internal mask depending upon whether four pictures are to be taken simultaneously through the peripheral lenses 22 or a single picture through the central lens 24. The knob is retained in each position by a locking pin 60 which extends therefrom and which is seated within spaced openings 62 (only a single opening being shown in FIG. 13) which are oriented so as to retain the control knob in a selected position. In order to move the mask between the raised and lower positions, it is necessary to pull the knob outwardly, as shown by the arrow in FIG. 13, against the force of the spring 56 and thereafter rotate the control knob to the selected position. Afterwhich, the spring automatically relocks the control knob in the selected position with the locking pin 60 seated within one of the openings 62.

The mask is designed to be utilized in the raised position to divide a frame of film into four generally equal frame segments. In this respect, the mask includes generally parallel side walls 64 and 65 and a central vertical wall 66 which is parallel to the side walls 64 and 65 and which is connected thereto by a horizontal wall component 67. The walls 64–67 extend inwardly of the central housing from adjacent an enlarged opening 68 in the back of the central section of the camera, as shown in FIG. 5. The vertical wall segments 64–66 include bevelled lower edges, such as shown at 69 in FIG. 5, and the upper edge of the central wall 66 is also tapered downwardly, as shown in 70, in order to provide clearance for movement of the mask within the chamber defined by the central housing, as shown by the arrow in FIG. 7. In a preferred embodiment, to provide a defined border between each of the sections of the frame of film when four pictures are being taken simultaneously, masking flanges 71 are provided along the forward edges of each of the walls 66 and 67.

Figure 10:
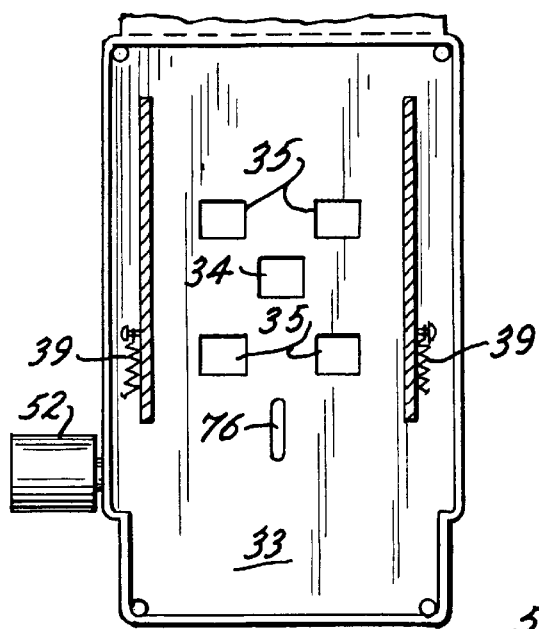
FIG. 10 is a cross-sectional view along line 10—10 of FIG. 5.
Figure 11:
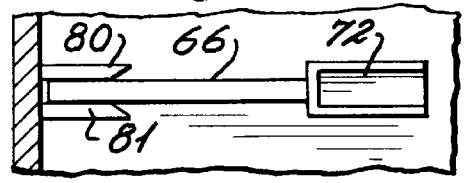
FIG. 11 is an enlarged view taken along line 11—11 of FIG. 5.
Figure 12:
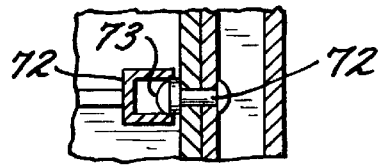
FIG. 12 is an enlarged view taken along line 12—12 of FIG. 7.

As previously noted, the selector plate 38 is controlled by the movement of the mask between its upper and lower positions. In order to accomplish this, in the preferred embodiment, the central wall 66 of the mask is provided along the forward portion of the upper edge 70 with a generally U-shaped receiver or housing 72, FIG. 7, which is designed to engage the head 73 of a guide pin or screw 74 which extends through a vertical slot 76, FIG. 10, provided in the front wall 33 of the central housing 29 and through an opening 77 in the selector plate 38. The engagement of the housing 72 with the head of the guide pin 74 drives the selector plate downwardly relative to the slot 76, thus moving the guide plate 38 from the upper position in FIG. 4 to the lower position of FIG. 6 as the control knob 52 is rotated to move the mask from the raised to the lowered position. Upon the reverse movement of the control knob 52 to raise the mask, the pin member 76 is free to ride in the guide slot 76 and movement is effected by the springs 39, as previously discussed. In the raised position, the central mask wall 66 is guided and stabilized to ensure proper positioning by a pair of opposing flange elements 80 and 81 which extend from the rear wall of the central housing of the camera, as shown in FIG. 11.

In view of the foregoing, the present invention provides a very unique and efficient mechanism for utilizing a single camera to take either a single picture on a frame of film or to take four pictures simultaneously of the same image on four sections of a single frame of film. The selection process is dictated by the movement of the control knob 52 to move a mask from a lower position, as shown in FIG. 7, wherein the selector plate is moved to a position to obscure the peripheral lenses 22 and open the film frame "F" to exposure through the central lens 24. If four pictures of the same object are desired, the control knob is rotated so as to raise the mask to the position shown in FIG. 5. This movement causes the selector plate to automatically shift upwardly to thereby obscure the central lens 24 but open the peripheral lenses 22 to the four separate sections of the film frame which are defined between the walls of the mask.

As previously noted, although separate shutter activating switches or knobs may be utilized to expose either the central or the peripheral lenses, with the structure of the present camera, a single shutter trigger may be utilized to simultaneously open each of the shutters 23 and 25. The selector plate will automatically prevent the passage of light from the undesired lenses depending upon the positioning of the selector plate.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. In a camera for selectively exposing a frame of film contained therein to a single lens or to a plurality of lenses wherein the camera includes a body and a front portion, the improvement comprising, a central lens mounted in the front portion of the camera and having a shutter, a plurality of peripheral lenses mounted in generally equally outwardly spaced relationship from said central lens in the front portion of the camera and each peripheral lens having a shutter, a selector means moveable relative to said central and peripheral lenses from a first position in which said selector means is adapted to block said peripheral lenses from exposing film contained within the camera to a second position wherein said selector means is adapted to block said central lens from exposing film contained within the camera, means for selectively moving said selector means between said first and said second positions, a mask mounted within said body and having a plurality of openings therein, means for moving said mask from a first position in the body wherein said mask is spaced from film contained within the camera when said selector means is in said first position thereof to a second position within said body wherein said mask is spaced between said peripheral lenses and film contained within the camera with said plurality of openings forming separated film exposure areas for said plurality of peripheral lenses when said selector means is in said second position, and means for operating said shutters of said central lens and said peripheral lenses.

2. The camera of claim 1 in which said means for selectively moving said selector means includes said mask having a portion engageable with said selector means when said mask is moved from said second position to said first position thereof.

3. The camera of claim 2 wherein said means for selectively moving said selector means further includes means for resiliently moving said selector means from said second position to said first position thereof when said mask is moved from said first position toward said second position thereof.

4. The camera of claim 3 wherein said selector means includes a slide plate having a central opening therein which is aligned with said central lens in said first position thereof and a plurality of outer openings which are aligned with said plurality of peripheral lenses in said second position thereof.

5. The camera of claim 4 including a pair of spaced guide flanges mounted to said body, said slide plate being guidingly received between said guide flanges.

6. The camera of claim 4 wherein said means for moving said mask includes a pivot shaft extending from said body of the camera, and means mounted to said pivot shaft for selectively pivoting said pivot shaft and said mask between said first and second positions thereof.

7. The camera of claim 6 wherein said mask includes vertical and horizontal screen members which divide said plurality of openings therein and which function to prevent halations from being formed on film exposed through said plurality of openings.

8. The camera of claim 6 including means for retaining said means mounted to said pivot shaft in a selected position to thereby retain said mask in said first or second position thereof.

9. The camera of claim 8 wherein said means mounted to said pivot shaft includes a knob having a pin extending therefrom, said knob being resiliently mounted to said pivot shaft so as to be moveable axially with respect thereto, and said pin being selectively seated in separate spaced openings in said body when said mask is in said first or second position thereof.

10. The camera of claim 6 including four peripheral lenses and said mask defining four openings therein.

11. In a camera for selectively exposing a frame of film contained therein to a single lens or to a plurality of lenses wherein the camera includes a body and a front portion, the improvement comprising, a central lens mounted in the front portion of the camera and having a shutter, a plurality of peripheral lenses mounted in generally equally outwardly spaced relationship from said central lens in front portion of the camera and each peripheral lens having a shutter, a mask mounted within said body and having a plurality of openings therein, means for moving said mask from a first position in the body wherein said mask is spaced from film contained within the camera to a second position within said body wherein said mask is spaced between said peripheral lenses and film contained within the camera with said plurality of openings forming separated film exposure areas for said plurality of peripheral lenses, means operable in response to movement of said mask to permit exposure of film within the camera by way of said central lens when said mask is in said first position and to permit exposure of film within the camera by way of said plurality of peripheral lenses when said mask is in said second position, and means for operating said shutters of said central lens and said peripheral lenses.

12. The camera of claim 11 wherein said means for moving said mask includes a pivot shaft extending from said body of the camera, and means mounted to said pivot shaft for selectively pivoting said pivot shaft and said mask between said first and second positions thereof.

13. The camera of claim 12 wherein said mask includes vertical and horizontal screen members which divide said plurality of openings therein and which function to prevent halations from being formed on film exposed through said plurality of openings.

14. The camera of claim 11 in which said means operable in response to movement of said mask includes a plate having a central opening therethrough which is aligned with said central lens when said mask is in said first position thereof and a plurality of outer openings therethrough which are aligned with said peripheral lenses when said mask is in said second position thereof.

15. The camera of claim 14 including four peripheral lenses and said mask defining four openings therein.

16. The camera of claim 11 including means for retaining said mask in said first and second positions thereof.

17. In a camera for selectively exposing a frame of film contained therein to a single lens or to a plurality of lenses wherein the camera includes a body and a front portion, the improvement comprising, a central lens mounted in the front portion of the camera and having a shutter, a plurality of peripheral lenses mounted in generally equally outwardly spaced relationship from said central lens in the front portion of the camera and each peripheral lens having a shutter, a selector means moveable relative to said central and peripheral lenses from a first position in which said selector means is adapted to block said peripheral lenses from exposing film contained within the camera to a second position wherein said selector means is adapted to block said central lens from exposing film contained within the camera, means for selectively moving said selector means between said first and said second positions, and means for operating said shutters of said central lens and said peripheral lenses.

* * * * *